Aug. 12, 1924.
J. B. BENTON
CATTLE POKE
Original Filed March 5, 1923
1,504,317
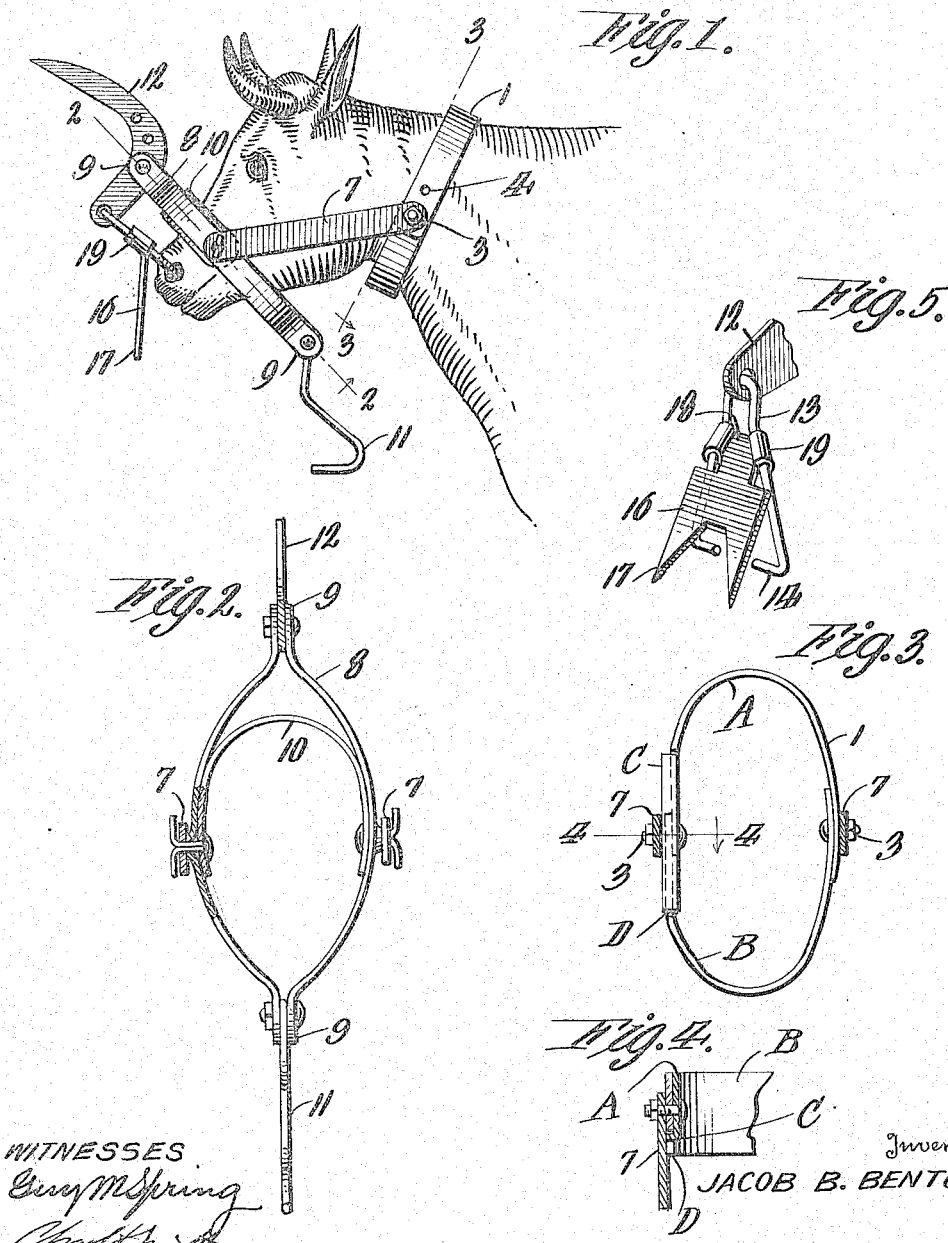
Inventor
JACOB B. BENTON
By Richard B. Owen
Attorney Patented Aug. 12, 1924.

1,504,317

UNITED STATES PATENT OFFICE.

JACOB B. BENTON, OF McLEAN, TEXAS, ASSIGNOR, BY DIRECT AND MESNE ASSIGNMENTS, TO THE CONTINENTAL TOOL AND MANUFACTURING COMPANY, OF CHICKASHA, OKLAHOMA, A BUSINESS TRUST.

CATTLE POKE.

Application filed March 5, 1923, Serial No. 623,044. Renewed May 22, 1924.

*To all whom it may concern:*

Be it known that I, JACOB B. BENTON, a citizen of the United States, residing at McLean, in the county of Gray and State of Texas, have invented certain new and useful Improvements in a Cattle Poke, of which the following is a specification.

This invention relates to a cattle poke and has for its principal object to provide a device carried by an animal for preventing him from going through fences and also from tampering with the fences.

Another important object of the invention is to provide a device of this nature having means for causing pain to the animal upon which the device is mounted when he attempts to tamper with a fence thus soon educating the animal to leave fences and the like alone.

Another important object of the invention is to generally improve upon devices of this nature by providing a simple and efficient structure which is reliable, durable, and well adapted for the purpose for which it is designed.

With the above and numerous other objects in view as will appear as the description progresses, the invention consists of certain novel features of construction, and in the combination and arrangement of parts as will be hereinafter more fully described and claimed.

In the drawing—

Figure 1 is a side elevation of the device embodying my invention showing the same as used, Figures 2 and 3 are detail sections taken substantially on the lines 2—2 and 3—3 respectively of Figure 1, looking in the direction of the arrows, Figure 4 is a detail section taken substantially on the line 4—4 of Figure 3 looking in the direction of the arrow, and Figure 5 is a detail perspective of the nose engaging element with the shield attached thereto.

Referring to the drawing in detail it will be seen that the preferred embodiment of the device consists of a yoke 1 formed in two sections of bowed or curved formation having their ends connected by bolts 3 passing through apertures 4. There are provided two or more of these apertures 4 so that the size of the yoke may be varied as desired.

Section A of the yoke 1 is provided at one end with a flange C that engages the adjacent end of the section B fitting in the notch D provided therein and thus the sections A and B may pivot in one direction only. Thus if the yoke 1 is pushed toward the body of the animal it will not pivot whereas if it is pushed toward the head of the animal the impetus being at the pivot point will cause the sections to pivot in relation to each other and thus the yoke would be difficult to remove over the head of the animal. In this manner accidental removal of the yoke is practically impossible. A pair of links 7 are attached to the yoke 1 by the bolts 3 and extend along the cheeks of the animal for supporting the member 8 which is formed of two bowed sections terminating in parallelly extending apertured lips 9. A supporting bridge 10 is connected to the intermediate portions of the sections of the member 8 and is of bowed construction adapted to rest on the nose of the animal and if desired suitable padding may be added to this bridge member. A hook 11 is pivotally carried between the lower ears 9 and an angular member 12 in the form of a bell crank lever is pivoted between the upper ears 9. One end of this bell crank lever 12 that is the normally uppermost end is pointed and the other end is apertured. A nostril engaging member 13 is mounted on the lower end of the lever 12 and is in the form of a U-shaped bail having its intermediate portion engaged with the apertured end of the lever while the terminals of the bail extend inwardly forming the extensions 14 which are adapted to be disposed in the openings of the nostrils as indicated in Figure 1. It will thus be seen that should the animal attempt to pass through an opening in a fence the lever 12 would engage with the fence and further movement on the part of the animal would tend to fulcrum the same thereby pulling upon the nostril engaging member 13 and causing considerable pain to the animal whereby he would naturally draw back and after repeated attempts would be educated to keep from further engagement with such apparatus.

A guard or shield plate 16 is mounted on the nostril engaging member 13 and is constructed with a pair of spaced depending prongs 17 and an upper extension 18 having sleeves 19 for receiving the legs of the member 13. Because of this shield or guard plate 16 it would be quite impossible for the animal to engage his teeth with a post or fence or any other vertically disposed object but at the same time he could graze.

It is thought that the construction and operation of the device will now be readily understood without a more detailed description. It is, however, desired to point out that numerous changes in the details of construction and in the combination and arrangement of parts may be resorted to without departing from the spirit of the invention as hereinafter claimed.

Having thus described my invention what I claim as new is:—

In a device of the class described, a neck yoke including a pair of bowed sections pivoted together at their terminals, means for preventing the bowed sections from pivoting toward the head of the animal on which the yoke is placed, a pair of links connected to the bowed sections at their pivoted points and extending forwardly therefrom and a poke attached to the forward ends of said links so that should the animal endeavor to remove the poke the links will be pulled thereby pulling forwardly of the pivot points from the yoke causing the sections thereof to pivot thus making it impossible to slip the yoke over the animal's head.

In testimony whereof I affix my signature in presence of two witnesses.

JACOB B. BENTON.

Witnesses:
C. L. COOKE,
W. L. CAMPBELL.